United States Patent [19]
Daoud

[11] Patent Number: 6,088,876
[45] Date of Patent: Jul. 18, 2000

[54] SEALING GROMMET

[75] Inventor: Bassel Hage Daoud, Parsippany, N.J.

[73] Assignee: Lucent Technologies, Inc., Murray Hill, N.J.

[21] Appl. No.: 09/163,703

[22] Filed: Sep. 30, 1998

[51] Int. Cl.[7] .............................. F16L 5/02; H01B 17/26
[52] U.S. Cl. ......................................... 16/2.2; 174/153 G
[58] Field of Search .................. 16/2.1, 2.2; 174/153 G, 174/153 A, 152 G, 152 R, 152 A, 65 G, 65 R

[56] References Cited

U.S. PATENT DOCUMENTS

| | | | |
|---|---|---|---|
| 2,897,533 | 8/1959 | Bull et al. | 16/2.1 |
| 3,288,407 | 11/1966 | Downer et al. | 16/2.1 |
| 4,945,193 | 7/1990 | Oikawa et al. | 174/153 G |
| 5,701,634 | 12/1997 | Uemura et al. | 16/2.1 |
| 5,732,440 | 3/1998 | Wright | 16/2.2 |
| 5,739,475 | 4/1998 | Fujisawa et al. | 174/153 G |

*Primary Examiner*—Chuck Y. Mah

[57] ABSTRACT

A grommet for sealing the interface between two vertically stacked building entrance protector and for protecting wires and/or cables traversing through openings of one building entrance protector to another. The grommet comprises a tubular body defining an axial passageway therebetween wherein cables and/or wires traverse. The tubular body has a diameter the same or smaller than the openings on the sidewall of the upper building entrance protector such that the tubular body fits within the opening. At one end of tubular body is an integral annular base having a diameter larger than the opening on the sidewall of the lower building entrance protector. Radially extending from the mid section of the tubular body towards annular base is an integral flange having a diameter larger than the annular base and having at least one circular ridge. The opening of the lower building entrance protector fits between the circular ridge and the annular base, where the distance between the ridge and the annular base is narrower than the thickness of the sidewall of the lower building entrance protector which causes the ridge to deflect and resilient engage and exert pressure against the sidewall to seal the opening of the lower building entrance protector.

8 Claims, 4 Drawing Sheets

SEALING GROMMET

FIELD OF THE INVENTION

The invention relates to a device that seals the interface between two building entrance protectors and protects wires and/or cables entering or exiting through openings of the building entrance protectors. It is particularly useful for preventing undesired elements from entering corresponding openings of adjacent building entrance protectors.

BACKGROUND OF THE INVENTION

A building entrance protector, i.e. junction box, provides an interface for cables from the central office of the service provider for distribution to subscribers throughout the building served by the junction box. Numerous cables and wires enter and exit a junction box through openings on the sidewalls. When the capacity of the building entrance protector and/or the number of subscribers in the building increase, one or more additional building entrance protector may be added to accommodate additional cables from the central office.

Cables and/or wires in the additional junction box interact with the original junction box via openings on the boxes. Cables and/or wires traversing openings of a junction box are subject to chafing against the edges of the openings. This problem is amplified for sheet metal junction boxes, where the sharp edges of the openings may pierce through the insulated coating of cables and/or wires over time, resulting in a short or severe the cables and/or wires, resulting in complete failure of the equipment.

To protect cables and/or wires from chafing against the edges of openings of junction boxes, a rubber annular ring grommet is used to cover the sharp edges. The annular ring grommet has a radial groove defined by a pair of radial lips that fit over the circular edge of the opening. Each of the radial lips sit on and advantageously resiliently engage opposite surfaces of the sidewall surrounding the opening and maintain the grommet in position.

For outdoor environment, the additional junction box is stacked vertically on top of and abutting the existing box to limit the amount of undesired elements from entering the junction boxes. External elements such as water, insects, dust, etc. may interfere with the proper operation of the electrical equipment located in a junction box, which may result in complete failure of the equipment. Vertically stacked boxes allow cables and/or wires to traverse their openings vertically which limit some undesired elements from entering the lower box. However, by merely stacking one junction box on top of another cannot effectively prevent all undesired elements, especially water, from entering the lower junction boxes.

U.S. Pat. No. 5,550,916 discloses a stackable junction box particularly suited for outdoor use. Junction box 10 provides openings 37 and 38 for cables and/or wires to traverse from openings 47 and 48 of a corresponding junction box stacked on top of junction box 10. Around the periphery of the top surface 31 is a strip of sealing material 36 which prevents undesired elements from entering openings 37, 38, 47 and 48 of junction box 10 when two boxes are stacked. Upon stacking a corresponding junction box on top of junction box 10, the upper box is compressed against the sealing material 36 of the lower box 10 to provide a sealed interface between two vertically stacked junction boxes. U.S. Pat. No. 5,550,916 discussed herein is hereby incorporated by reference as background of the invention.

Although junction box 10 disclosed in U.S. Pat. No. 5,550,916 provides a sealed interface between two vertically stacked junction boxes, it requires the manufacturing of special boxes having sealing material 36, which can be costly. Furthermore, compression of two vertically stacked junction boxes is time consuming to a service technician and may not be achievable if the additional box cannot physically be stacked vertically abutting the lower box due to the surrounding area of the junction box.

To properly seal the interface between two stacked junction boxes and protect the cables and/or wires traversing the two boxes can be costly and time consuming because a service technician must replace existing boxes and maneuver a separate grommet. Therefore, there is a need for a device that seals the interface between two adjacently stacked junction boxes and protects cables and/or wires traversing openings of the two boxes in a cost-effective manner.

SUMMARY OF THE INVENTION

The invention provides a device for sealing the interface between two adjacently stacked junction boxes and for protecting cables and/or wires traversing openings of the two boxes.

The invention provides a grommet that fits around openings of junction boxes, having an axial passageway for cables and/or wires to traverse, an annular base for positioning against one surface of the opening and a mid section having a radially flange with a plurality of concentrically circular hoops or bands forming a series of fingers extending towards the annular base for positioning against the opposite surface of the opening. The opening of a junction box fits around the grommet between the annular base and the plurality of concentrically circular fingers, which prevent undesired elements from entering the opening.

The grommet of the present invention comprises a generally tubular body defining an axial passageway for cables and/or wires to pass through. The outer diameter of the tubular body matches or is smaller than the diameter of the opening of the junction box. At one end of the tubular body is an integral annular base having a diameter wider than the opening and sharing the same axial passageway. Integrally extending from the outer surface of the mid section of the tubular body is a radial flange with at least one circular finger, extending towards the annular base. The finger is at a distance from annular base that is smaller than the thickness of the sidewall of the junction box where the opening to be sealed by the grommet is located. The sidewall of the opening is fitted between the annular base and the finger such that the finger is deflected due to the thickness of the sidewall and resiliently engages and exerts pressure against the sidewall, which seals off the opening of the junction box from external elements. A plurality of fingers provide multiple sealing points where undesired elements cannot pass through.

DETAILED DESCRIPTION OF THE PREFERRED EMBODIMENTS

Figure 1:
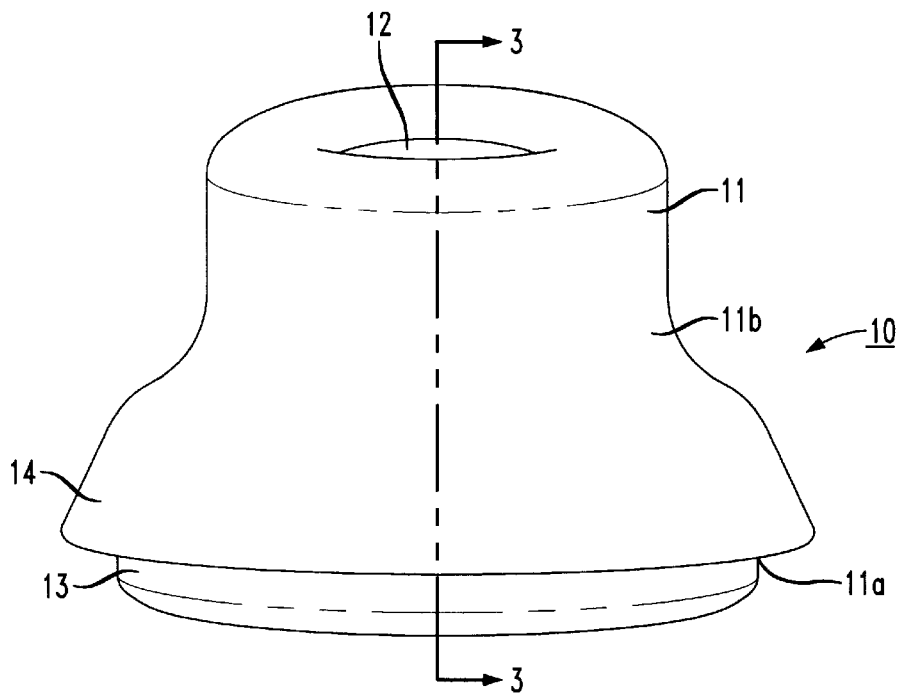
FIG. 1 is a top perspective view of the present invention.

With reference to the drawings, wherein the same reference number indicates the same element throughout, there is shown in FIG. 1 a top perspective view of the present invention.

The present invention, grommet 10, as shown in FIG. 1, comprises a generally tubular body 11 defining an axial passageway 12 therebetween. At the bottom section 11a of tubular body 11 is an integral annular base 13, best shown in FIGS. 2 and 3.

Figure 2:
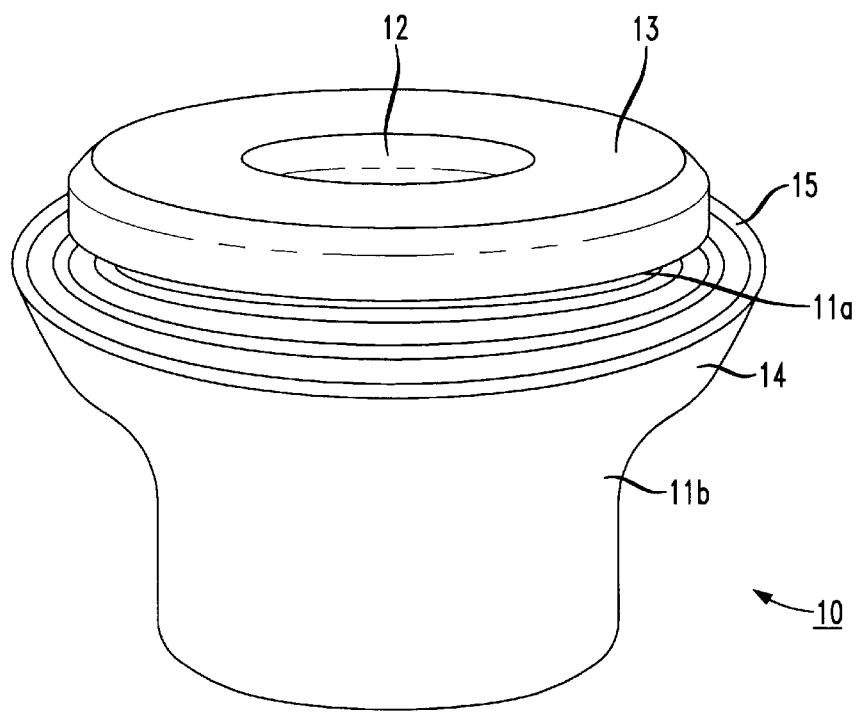
FIG. 2 is a bottom perspective view illustrating the annular base and concentrically circular ridges.
Figure 3:
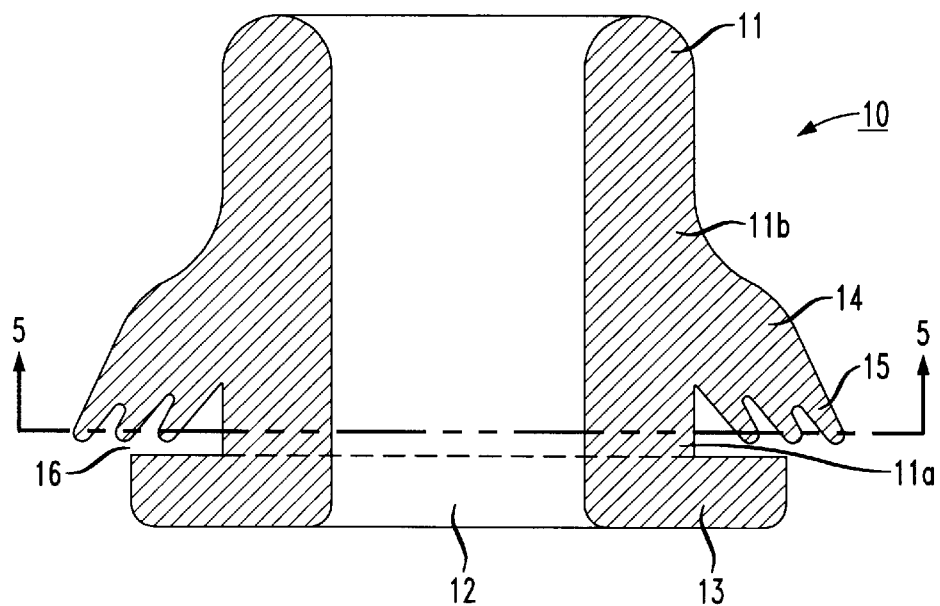
FIG. 3 is a cross-sectional view taken along line 3—3 in FIG. 1.
Figure 4:
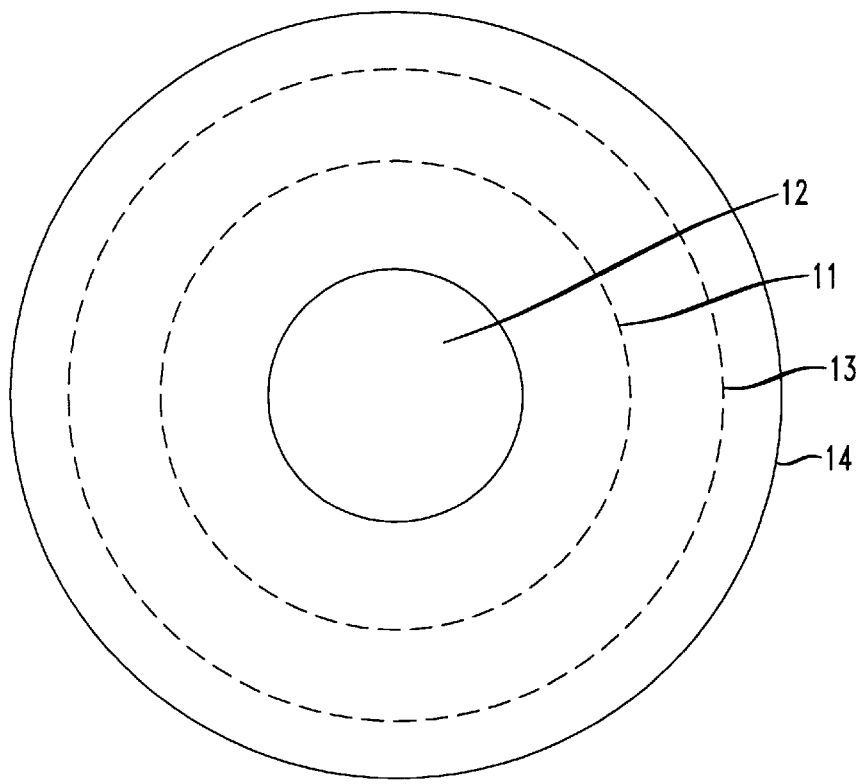
FIG. 4 is a top plan view of the present invention.
Figure 5:
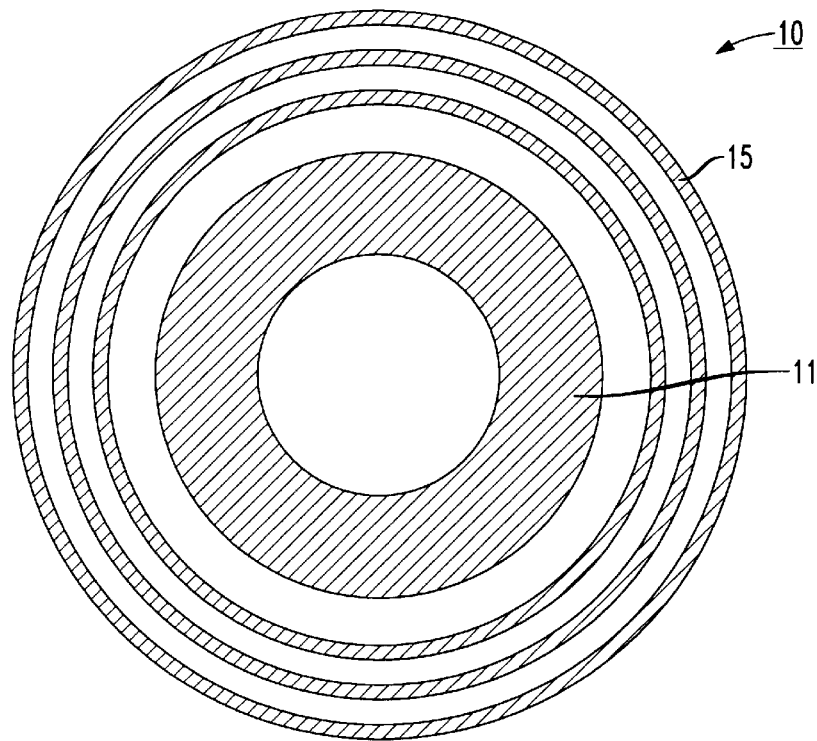
FIG. 5 is a cross-sectional view illustrating the concentrically circular fingers taken along line 5—5 in FIG. 3.

As shown in FIGS. 2 and 3, annular base 13 has a wider diameter than that of tubular body 11 and shares the same axial passageway 12. Radially extending from the mid section 11b of the tubular body 11 towards annular base 13 is an integral radial flange 14 having a diameter wider than that of annular base 13, best shown in FIGS. 3 and 4. Flange 14 comprises three concentrically circular fingers 15, best shown in FIG. 5, extending towards annular base 13, defining a gap 16 therebetween. Gap 16 is at a distance smaller than the thickness of the sidewall of a junction box having an opening where grommet 10 is used, as described below.

Figure 6:
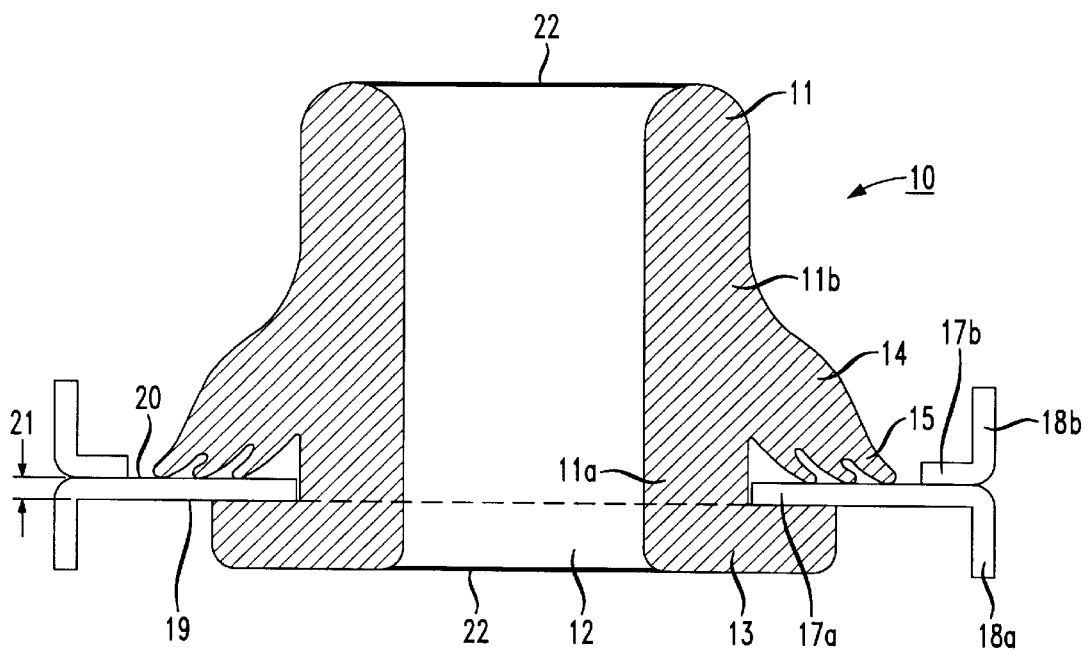
FIG. 6 is a cross-sectional view of FIG. 3 shown in the position of sealing openings of abuttingly stacked junction boxes.

FIG. 6 shows grommet 10 positioned in an opening 17a on the sidewall of a lower junction box 18a having an upper junction box 18b vertically stacked thereupon. Junction box 18b with an opening 17b is shown to be stacked abutting junction box 18a. Grommet 10 is made of a resilient material such as neoprene rubber, but other resilient material known to one skilled in the art may be substituted. The flexibility of the grommet material allows grommet 10 to be fitted around opening 17a, with annular base 13 resting against the inside surface 19 of junction box 18a and the circular fingers 15 resting against the outside surface 20 of junction box 18a. The thickness 21 of junction box 18a is larger than gap 16 such that when grommet 10 is fitted in opening 17a, the sidewall of junction box 18a forces the circular fingers 15 to deflect and at the same time, fingers 15 resiliently engage and exert pressure against the outside surface 20 of junction box 18a, creating a seal around opening 17a. The multiple contact points between fingers 15 and outside surface 20 of box 18a prevents undesired elements from entering junction box 18a. Furthermore, liquid cannot travel upward over tubular body 11 to enter junction box 18a through axial passageway 12. Added measure to prevent liquid from entering junction box 18a through axial passageway 12 can be achieved by providing a layer of a pierceable material 22 covering one or both ends of axial passageway 12 wherein cables and/or wires may pass and other elements are hindered from passing through.

Figure 7:
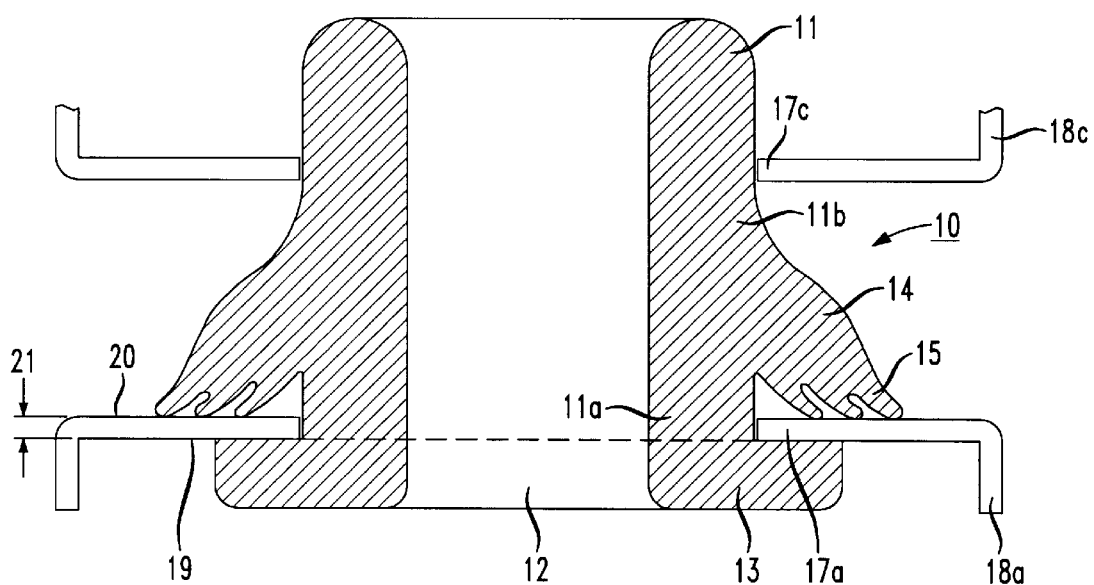
FIG. 7 is a cross-sectional view of FIG. 3 shown in the position of sealing openings of adjacently stacked junction boxes.

Grommet 10 also allows two junction boxes be stacked adjacent to each other instead of directly abutting each other as shown in FIG. 6. FIG. 7 shows junction box 18c having opening 17c stacked adjacent junction box 18a. With opening 17c matching the diameter of tubular body 11, grommet 10 prevents undesired elements from entering junction box 18c. The configuration of grommet 10 with flange 14 wider than tubular body 11 advantageously deflect any water and/or dust, etc. downward away from upper junction box 18c. The size of opening 17c of adjacent junction box 18c may be larger in diameter than tubular body 11 such that opening 17c can rest at a lowered position than that shown in FIG. 7 against flange 14 instead of tubular body 11 (not shown).

Although grommet 10 as shown in FIGS. 1–7 has a gap 16 between circular fingers 15 and annular base 13, the resiliency of grommet 10 allows opening 17a of junction box 18a to fit between circular fingers 15 that are in contact with annular base 13.

As shown in FIGS. 6 and 7, cables and/or wires (not shown) traverse through openings 17a, 17b or 17c via axial passageway 12 of grommet 10, which prevents the cables and/or wires from chafing against sharp edges of openings 17a, 17b or 17c.

The height and diameter of grommet 10 can vary depending on the size of the openings of the junction boxes and the distance between the two adjacent junction boxes. Further, the number of concentrically circular fingers may vary to provide more or less sealing contact points.

Although certain features of the invention have been illustrated and described herein, other better modifications and changes will occur to those skilled in the art. It is, therefore, to be understood that the appended claims are intended to cover all such modification and changes that fall within the spirit of the invention.

What I claim is:

1. A device for sealing the interface between a lower and an upper vertically stacked building entrance protectors, each protector having facing sidewalls, each with an opening of predetermined diameter for cables and/or wires to traverse between said lower building entrance protector and said upper building entrance protector, each of said sidewalls having a surface, comprising:

a tubular body having a predetermined outer diameter that fits within said opening on said sidewall of said upper building entrance protector, and having a bottom section and a mid section;

an integral annular base extending transversely from said bottom section with a diameter larger than said predetermined diameter of said tubular body; and an integral flange having at least one circular resilient finger with a diameter larger than said annular base radially extending from said mid section towards said annular base, wherein said opening on said sidewall of said lower building entrance protector fits between said finger and said annular base such that said finger deflects away from and resiliently engages and exerts pressure against said surface of said sidewall of said lower building entrance protector, creating a seal around said opening on said sidewall of said lower building entrance protector.

2. The device according to claim 1 wherein said tubular body further defines an axial passageway wherein said cables and/or wires traverse between said lower and upper building entrance protectors.

3. The device according to claim 2 wherein said annular base shares said axial passageway of said tubular body.

4. The device according to claim 2 wherein said axial passageway having two opposite ends with a layer of pierceable material covering at least one end wherein said cables and/or wires may pierce through.

5. The device according to claim 1 wherein said sidewall of said lower building entrance protector having a thickness, said circular finger and said annular base define a gap therebetween, said gap being smaller than said thickness of said sidewall of said lower building entrance protector.

6. The device according to claim 1 wherein said integral flange having two or more concentrically circular fingers.

7. The device according to claim 1 wherein said integral flange having a diameter larger than said diameter of said opening on said sidewall of said upper building entrance protector.

8. The device according to claim 1 wherein said tubular body, said annular base, said integral flange and said finger are made of neoprene rubber.

* * * * *